United States Patent
Chen et al.

(10) Patent No.: US 8,385,351 B1
(45) Date of Patent: *Feb. 26, 2013

(54) MULTIPLE MEDIA FAIL-OVER TO ALTERNATE MEDIA

(75) Inventors: Yihsiu Chen, Middletown, NJ (US); Mark Jeffrey Foladare, East Brunswick, NJ (US); Samuel Glazer, New York, NY (US); Shelly B. Goldman, East Brunswick, NJ (US); Thaddeus Julius Kowalski, Summit, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 293 days.

This patent is subject to a terminal disclaimer.

(21) Appl. No.: 12/802,870

(22) Filed: Jun. 16, 2010

Related U.S. Application Data

(63) Continuation of application No. 10/884,413, filed on Jul. 3, 2004, now Pat. No. 7,769,021.

(51) Int. Cl.
*H04L 12/56* (2006.01)
*G06F 11/00* (2006.01)
*G06F 15/173* (2006.01)

(52) U.S. Cl. .................. 370/395.21; 370/230; 370/237; 709/223; 709/227

(58) Field of Classification Search ............. 370/395.21, 370/216–359.2; 709/220–227
See application file for complete search history.

(56) References Cited

U.S. PATENT DOCUMENTS

| | | | |
|---|---|---|---|
| 6,173,411 | B1 | 1/2001 | Hirst et al. |
| 6,202,170 | B1 | 3/2001 | Busschbach et al. |
| 6,286,058 | B1 | 9/2001 | Hrastar et al. |
| 6,373,852 | B1 * | 4/2002 | Foladare et al. ............. 370/465 |
| 6,389,555 | B2 * | 5/2002 | Purcell et al. .................. 714/10 |
| 6,714,534 | B1 * | 3/2004 | Gerszberg et al. ............ 370/352 |
| 6,868,057 | B1 | 3/2005 | Sha |
| 7,039,008 | B1 | 5/2006 | Howes et al. |
| 7,171,619 | B1 | 1/2007 | Bianco |
| 7,769,021 | B1 * | 8/2010 | Chen et al. ................. 370/395.21 |
| 2002/0049687 | A1 | 4/2002 | Helsper et al. |
| 2002/0069284 | A1 * | 6/2002 | Slemmer et al. ............. 709/227 |
| 2003/0023672 | A1 * | 1/2003 | Vaysman ....................... 709/203 |

* cited by examiner

*Primary Examiner* — Afsar Qureshi

(57) ABSTRACT

The present invention is a system and method for failing over from a current network access medium to an alternative network access medium. A customer premises equipment (CPE) box has ports for connections to a network through several network access media, such as high speed cable connections, DSL connections and dial-up connections. QoS parameters for each of the connections are monitored from a bandwidth manager remote from the CPE box. When it is determined that a fail-over would be beneficial, a message is sent from the bandwidth manager to the CPE box containing a command to fail-over and an identity of the alternate network access media.

16 Claims, 5 Drawing Sheets

MULTIPLE MEDIA FAIL-OVER TO ALTERNATE MEDIA

CROSS-REFERENCE TO RELATED APPLICATION

This application is a continuation application of U.S. patent application Ser. No. 10/884,413, filed Jul. 3, 2004, now U.S. Pat. No. 7,769,021 entitled "Multiple Media Fail-Over to Alternate Media," which is incorporated herein by reference in its entirety.

FIELD OF THE INVENTION

The present invention relates generally to providing a reliable wide area network connection for customer premises equipment. Specifically, the invention provides a method and apparatus for detecting failure or degradation of a network connection and switching to an alternate connection.

BACKGROUND OF THE INVENTION

It is frequently the case that a communications subscriber has access to a communications network through more than one access medium. For example, a single residence may have the capability to connect to the Internet through a residential digital subscriber line (DSL) connection and a high-speed cable connection. Further, most DSL and cable users have dial-up network access available as well. Frequently, more than one telephone line in a residence may be used for dial-up access to the Internet.

No network access medium is perfectly reliable. Network connections may degrade or fail for numerous reasons. For example, catastrophic physical problem such as a cable cut may cause a network connection to drop abruptly or suddenly degrade as traffic is rerouted. Network-related problems such as high network traffic volume may cause a network connection to gradually degrade or to fail intermittently.

A failure in a network is not detected by a subscriber until the performance of his or her connection degrades. At that point, the subscriber has several options. The subscriber can tolerate the slowed connection or discontinue the activity altogether. If the subscriber has an alternative connection available, he or she may manually terminate the current connection to the network (if not already terminated) and manually reconnect through the alternate medium. If the application requires a login sequence, then that must be redone. If the connected application is streaming data such as audio or video, then that stream is interrupted for the time taken to change over to the new network access medium.

From a subscriber's point of view, it is difficult to determine whether service degradation is, in fact, due to a failure in an access medium, or is due to other network problems further upstream. For example, in a case where service degradation is due to problems at the application server itself, a subscriber may change from one access medium to an alternative access medium without experiencing any resulting improvement in service quality.

Systems have been proposed to deal with fail-overs in other applications. U.S. Pat. No. 6,389,555 to Purcell et al. discloses a system for handling a link failure within a computer system with peripherals. Upon detection of a failure across a first link, the system engages fail-over mechanisms to re-establish communications over a second link.

U.S. Pat. No. 6,714,534 to Gerszberg et al. proposes a telephone network architecture that bypasses the local exchange carrier. Fail-over lifeline service is provided using cable, twisted pair or wireless solutions. An automatic change-over mechanism is not described.

U.S. Pat. No. 6,373,852 to Foladare et al. discloses an apparatus and method for linking multiple baseband telephone lines to provide broadband communication. For example, the invention allows an individual to use multiple plain old telephone service (POTS) lines in combination to emulate the capability of a broadband line.

There is presently a need for a method and system that can detect and possibly predict a connection failure in a medium providing a wide area network connection. The system should be capable of automatically changing from the failed or failing medium to an alternative, intact medium, with a minimum of disruption to the network connection services.

SUMMARY OF THE INVENTION

The present invention addresses the needs described above with a system and method for providing multiple media fail-over to an alternate medium. In one embodiment, the method provides automatic fail-over service for premises equipment that is accessing a network via a first network access medium. The fail-over service provides fail-over from the first network access medium to a second network access medium.

The method includes the step of determining, at a location remote from the premises equipment, a status relating to at least one of the first and second network access media, and, based on the status, transmitting a message to the premises equipment to change from accessing the network via the first network access medium to accessing the network via the second network access medium.

The location remote from the subscriber may be an application server connected through the network to the premises equipment. The step of determining a status may include receiving responses to network pings directed to the premises equipment.

Each of the first and second network access media may be a T1 service, a T3 service, a DSL line, an HFC cable network or a standard telephone access line. At least one of the first and second network access media may be a plurality of baseband access media carrying a signal multiplexed among them The step of determining a status may comprise obtaining current QoS metrics. That step may further comprise obtaining historical QoS metrics and comparing the current QoS metrics to the historical QoS metrics. In those cases, the method may also include the step of comparing at least one QoS metric of the first network access medium to a corresponding QoS metric of the second network access medium. The step of transmitting a message to change network access media may be performed only if the QoS metric of the second network access medium indicates a greater QoS than the corresponding QoS metric of the first network access medium.

The method may also include retrieving from a database an address of the premises equipment on the first network access medium, retrieving an address of the premises equipment on the second network access medium, and sending network pings to the retrieved addresses. Further, the method may include creating a record of the message transmitted to the premises equipment for use in a report In another embodiment of the invention, a bandwidth manager provides automatic fail-over service between first and second network access media connections from premises equipment to a network. The bandwidth manager is configured to perform the steps of determining a status relating to at least one of the first and second network access media, and, based on the status, sending a message to customer premises equipment to fail-over from the first network access medium to the second network access medium.

The bandwidth manager may be located in an application server connected to the premises equipment. Further, the step of determining a status may comprise receiving responses to network pings directed to the premises equipment.

The first and second network access media connected to the bandwidth manager may be a T1 trunk, a T3 trunk, a DSL line, an HFC cable network or a standard telephone access line. The step of determining a status may comprise obtaining current QoS data. In that case, the step of determining a status may further comprise obtaining historical QoS data and comparing the current QoS data to the historical QoS data.

In yet another embodiment of the invention, premises equipment has an automatic fail-over service between first and second network access media connections to a wide area network. The premises equipment includes a first connection to the network via a first network access medium and a second connection to the network via a second network access medium.

The premises equipment also includes a processor for executing instructions to receive a command from a remote location to fail-over from the first connection to the second connection, and to respond to that command by failing over from the first connection to the second connection.

The processor may further be for executing instructions to maintain the second connection in an active state. The second connection may be via dial-up modem, in which case the instructions to maintain the second connection in an active state include instructions to redial the modem as necessary. The premises equipment may include a LAN connection for client computers.

The processor may further be for executing instructions for storing a record of the failing-over in a report database At least one of the first and second communications connections may include a plurality of baseband connections and a data converter for converting between a plurality of multiplexed signals on the baseband connections and a single demultiplexed signal.

DESCRIPTION OF THE INVENTION

The present invention provides a technique and system for changing network access from a failed or failing network access medium to an alternative network access medium, preferably without active intervention by a subscriber and without substantial interruption in the subscriber's network access service.

Figure 1:
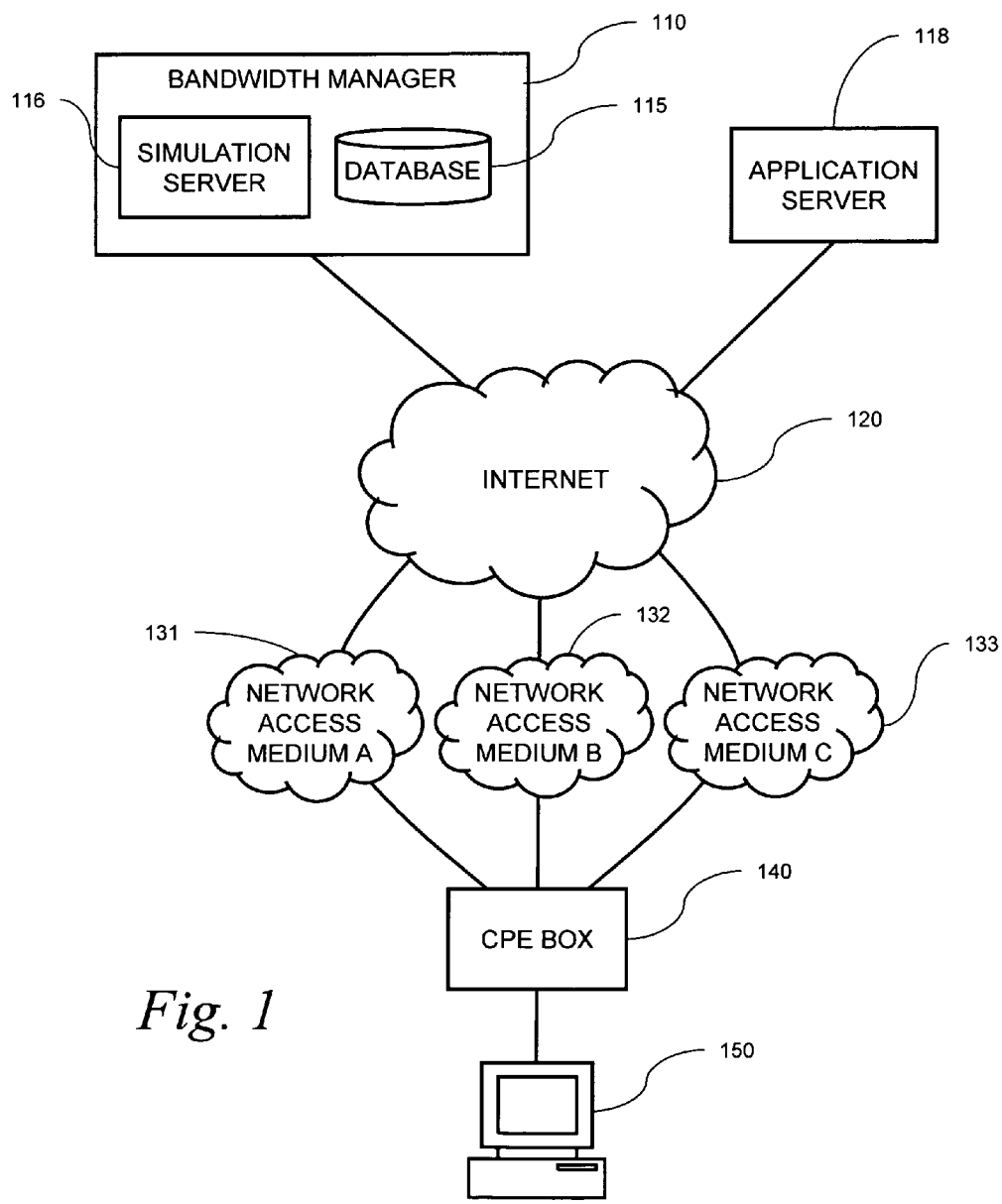
FIG. 1 is a block diagram of a network access system, according to one embodiment of the invention.

As shown in FIG. 1, a system according to the invention includes a client terminal 150 connected through a wide area network such as the Internet 120 to a bandwidth manager 110 and to an application server 118. In the embodiment of the invention illustrated in FIG. 1, the bandwidth manager includes a simulation server 116 and a database 115.

While the application server 118 and the bandwidth manager 110 are shown in the embodiment of FIG. 1 as separate entities, the bandwidth manager may reside within or be associated with the application server 118. In that case, the bandwidth manager may provide the fail-over services of the invention only for connections between the client terminal 150 and the application server 118. Alternatively, the bandwidth manager may provide the fail-over services of the invention as part of a network services bundle offered to a residential or business customer, in which case the fail-over services are available for a network connection between the client terminal 150 and any server on the network.

In yet another embodiment of the invention, the bandwidth manager may provide fail-over services in association with a number of subscribing application servers. In that case, the fail-over services are available for connections from any client terminal to a subscribing application server.

The client terminal 150 connects to the Internet through a customer premises equipment (CPE) box 140 as described in more detail below. The CPE Box 140 has connection ports for a plurality of alternative network medium A 131, network medium B 132, network medium C 133. For example, network access medium A may be a high-speed cable connection such as a hybrid fiber coaxial (HFC) connection. Network access medium B may be a DSL connection over a twisted pair line into the residence or business. Network access medium C may be a dial-up connection using a phone line modem connected to the same or a different twisted pair. Other possible network access media contemplated by the invention include T1/T3 trunks over twisted pair, coaxial cable or fiber, cellular wireless connections, and an IEEE 802.11, WIMAX (802.16), 802.20 or similar wireless connection to a local hub. The invention, however, is not limited to those media, and other media may be used without departing from the spirit of the invention.

The network access media may further include two or more alternative connections through similar media. For example, a residence may have two alternative DSL connections through two twisted pair lines. That same residence may have modem dial-up connections through those same lines. A business may have more than one T1 or T3 trunk service. In each instance, it is possible for a connection to be reinstated over an alternate route using similar media in the event that a route fails or is degraded.

Figure 2:
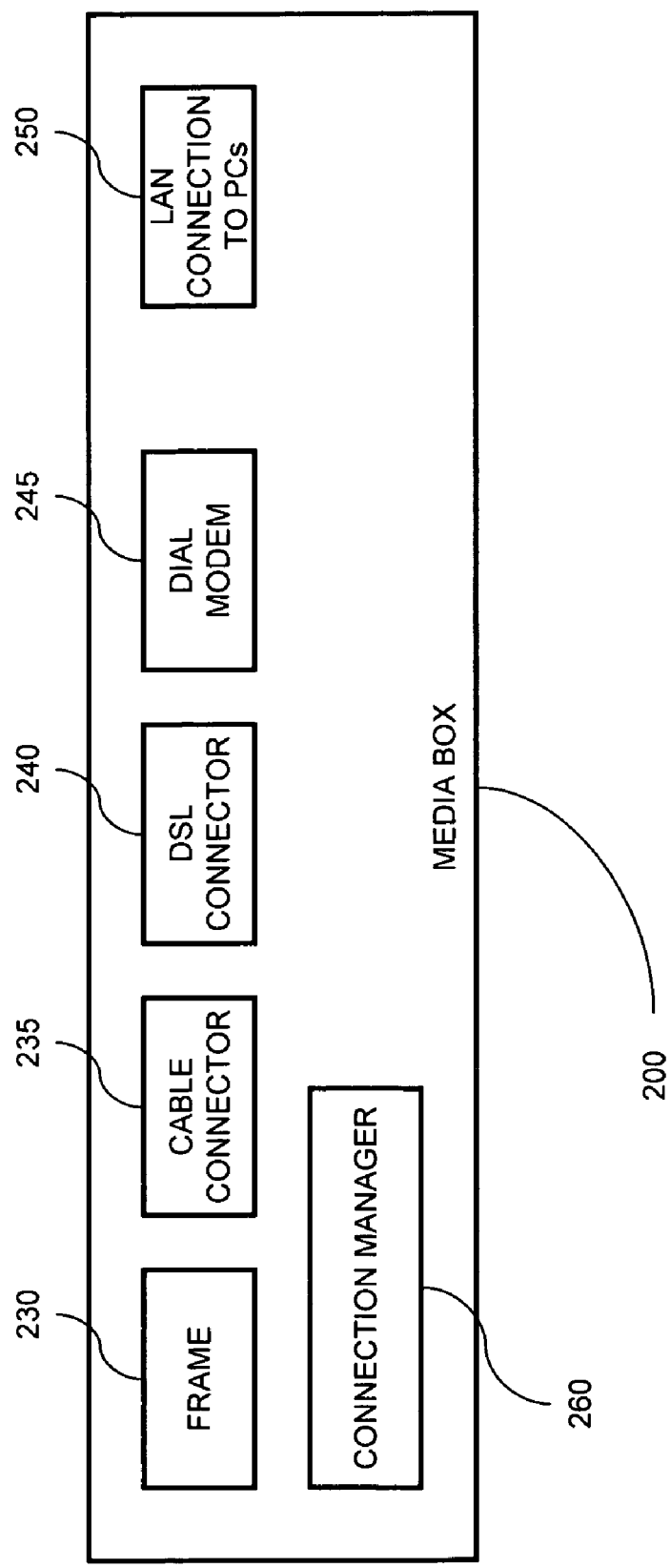
FIG. 2 is a schematic diagram of a customer premises equipment box according to an embodiment of the invention.

A CPE media box 200 according to one embodiment of the invention is shown in FIG. 2. The media box 200 contains a connection 250 to a residential or business local area network (LAN) containing one or more client terminals. For example, the LAN may be a wired Ethernet network or may be an 802.11 wireless network.

In addition, the media box 200 contains a plurality of gateways to network access media. For example, the media box 200 contains a frame connection 230 for access through a T1 or T3 trunk. A cable connector 235, together with a cable modem (not shown) provides access through a high-speed cable connection. A DSL connector 240 permits network access through a DSL connection. A dial-up modem 245 provides for dial-up network access.

The media box 200 furthermore may contain a connection manager 260 for controlling and managing connections to the network. In that embodiment, a processor is provided in the media box 200 to perform those functions. Alternatively, the connection manager 260 may reside as software running in one of the client terminals.

The connection manager 260 routes communications between the client terminals and the wide area network over a selected one of the available network connections, and can change the selected one of the connections in response to a command received through the public network from the bandwidth manager. For example, in the embodiment shown in FIG. 1, the connection manager may route communications over network access medium A 131, medium B 132 or medium C 133.

The connection manager may maintain each of the network access media 131, 132, 133 in an active state. While a cable connection or a DSL connection may be an "always on" connection, a dial-up connection may require occasional re-dialing as DHCP IP address leases expire, etc. The connection manager maintains the dial-up connections and similar connections by taking whatever action is necessary to maintain the connections active.

Alternatively, the connection manager may bring up needed connections on demand. For example, if the connection manager receives a command from the bandwidth manager to switch to a dial-up connection, the connection manager may initiate that connection by dialing a network service provider number through the modem and establishing the connection using any necessary ID and passwords.

The media box 200 may further be capable of combining several network access media to create a virtual high speed link, as is disclosed in U.S. Pat. No. 6,373,852 to Foladare et al., which is hereby incorporated by reference herein in its entirety. For example, a plurality of telephone lines may be connected to the media box 200 through a plurality of modems. The media box in that case has the capability to multiplex/demultiplex packet streams received or sent over the plurality of lines. A node in the telephone network performs the complementary operations at the opposite end of the media.

Figure 3:
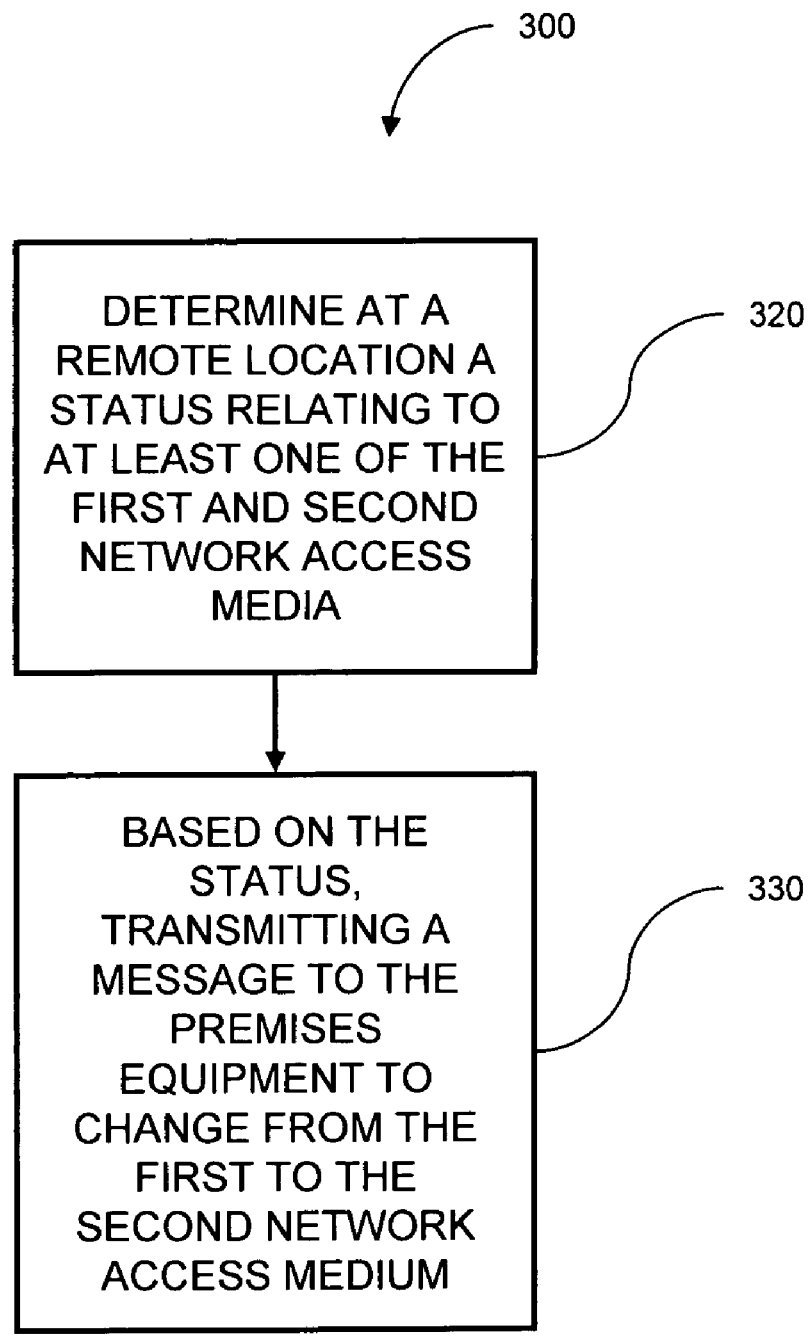
FIG. 3 is a flow chart depicting a method according to an embodiment of the invention.

FIG. 3 illustrates a method 300 performed by the bandwidth manager 110 (FIG. 1) in accordance with one embodiment of the invention. The method is described with two alternative network access media. A larger number of network access media increases the likelihood that at least one has adequate performance. In the method, the bandwidth manager determines a status (step 320) relating to at least one of the first and second network access media. In a preferred embodiment, the bandwidth manager monitors the connections through the first and second access media to detect status changes that may warrant a fail-over.

The bandwidth manager monitors the status of each network access medium connected to a CPE box by transmitting network pings to the CPE box and measuring round trip time, error rate and other parameters.

A bandwidth manager capable of monitoring network connections as is done in the present invention is described in the commonly-assigned U.S. patent application entitled, "Method and System for Dynamically Adjusting QoS," inventors Mark Foladare et al., U.S. application Ser. No. 10/732,750, filed on Dec. 10, 2003, which is hereby incorporated by reference in its entirety. The bandwidth manager 110 (FIG. 1) can obtain, receive, and/or collect current data and/or historical data, such as Quality of Service data, that relates to the subscribed service, the subscriber, the access point, the connection, and/or a link of the connection. QoS data can include a QoS metric and/or a QoS-affecting variable.

Bandwidth manager 110 can store current data and/or historical data in database 115. Bandwidth manager 110 and/or simulation server 116 can access database 115 and/or other data sources to obtain current data and/or historical data.

Simulation server 116 can analyze the current data and/or historical data. The analysis can include modeling future data based on the current and/or historical data. For example, one or more future QoS metrics can be estimated based on one or more current QoS metrics and/or one or more historical QoS metrics. This modeling can include modeling one or more future QoS metrics based on varying a QoS-affecting variable.

Based on the results of the analysis performed by simulation server 116, the bandwidth manager can adjust a predetermined QoS-affecting variable and thereby change a future QoS metric. Those QoS-affecting variables include the selection of a network access medium for the network connection, as described herein.

A wide variety of analytical techniques can be applied to current and/or historical data, such as, for example, probability analyses (e.g., a priori probabilities, conditional probabilities, and/or posteriori probabilities, etc.), distribution analysis, sampling theory, classification analysis (e.g., Bayesian Decision Theory, parametric techniques (such as Bayesian estimation, maximum likelihood estimation, and/or Markov models, etc.), nonparametric techniques (such as Parzen windows, nearest neighbor, etc.), linear discriminant techniques, neural networks, stochastic methods, nonmetric methods, algorithm-independent machine learning, and/or unsupervised learning and/or clustering), correlation theory and/or analysis (e.g., curve fitting, regression, multiple correlation, and/or partial correlation, etc.), analysis of variance, analysis of time series (e.g., smoothing, moving averages, trend estimation, estimation of seasonal variations and/or seasonal index, deseasonalization, estimate of cyclic variations, and/or estimate of irregular variations, etc.), forecasting, queuing theory, decision theory, and/or information theory.

For example, simulation server 116 can analyze current and/or historical data to determine patterns and/or dependencies, such as how changes in values of a variable affects QoS metrics such as sound clarity, sound fidelity, voice quality, video picture quality, video picture movement, video frame rate, response time, and/or error rate, etc. Based on the analysis of simulation server 116, QoS can be improved and/or optimized. Specifically, QoS can be optimized by selecting an optimum network access medium for use in the network connection.

Figure 4:
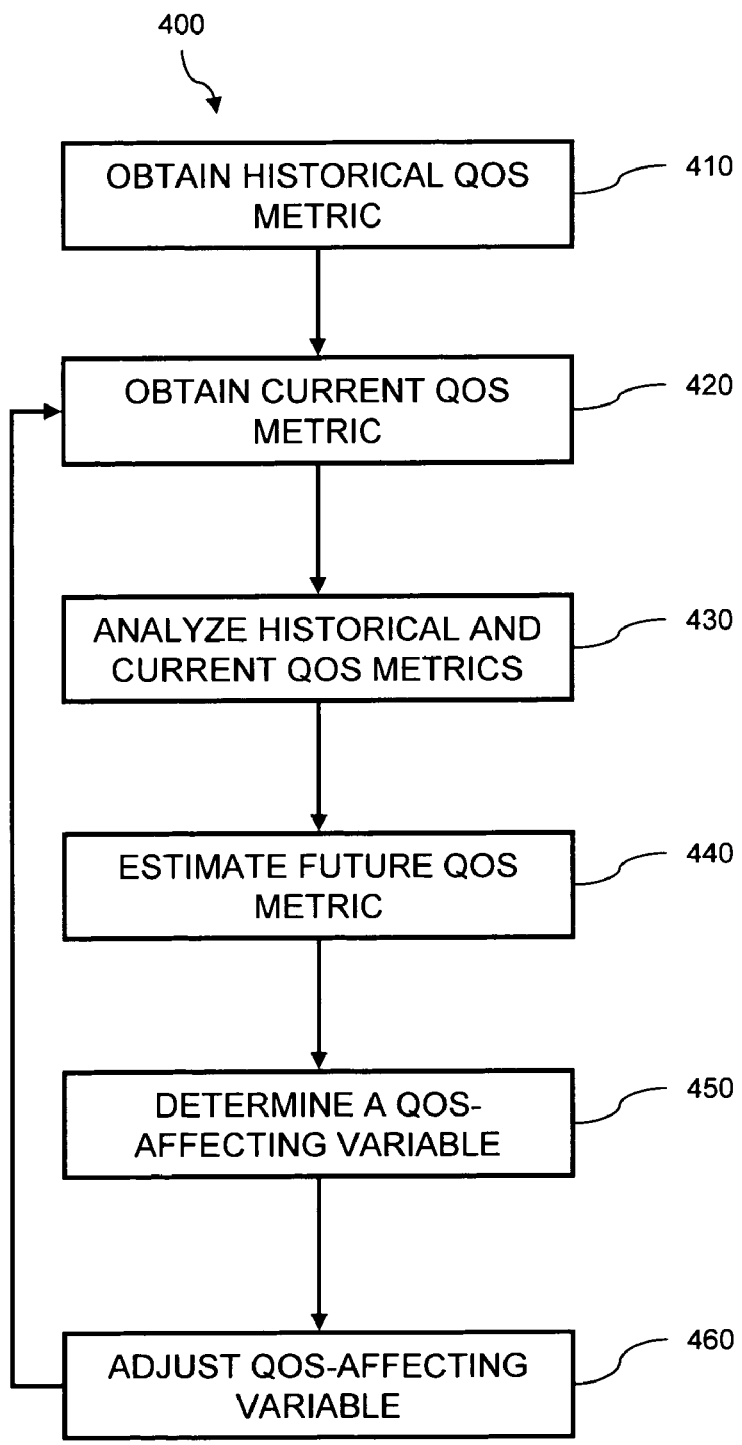
FIG. 4 is a schematic diagram showing a system utilizing one embodiment of the invention.

FIG. 4 is a flow diagram of an exemplary embodiment of a technique 400 for determining a status of a network access medium. One or more historical QoS metrics are initially obtained (step 410). One or more current QoS metrics are also obtained (step 420). The historical and/or current QoS metrics are analyzed (step 430). One or more future QoS metrics are then estimated (step 440). A QoS-affecting variable is then determined (step 450). The QoS-affecting variable may then be adjusted (step 460). Any of activities 410, 420, 430, 440, 450 and/or 460 may be repeated throughout the duration of a connection, and/or as long as an access point is being utilized by a subscribed service.

The above technique may be employed to determine a status of any or all of the network access media connections. The bandwidth manager then makes a determination whether to change from the currently-used network access medium to an alternative network access medium. That determination may be made by comparing one or more QoS metrics from each of the available media. If a medium is available with QoS metrics that indicate improved performance over the currently-used medium, then a switch is made.

To increase the stability of the system, the bandwidth manager may authorize a fail-over only if the QoS metrics show that a medium is available that will produce some predetermined improvement in performance over the status quo; for example, the bandwidth manager will authorize a fail-over only if it will produce a 30% improvement over current conditions.

Alternatively, the bandwidth manager may consider a fail-over only if performance using the current connection falls below some threshold value. The bandwidth manager, however, must also consider QoS metrics of the alternate connections to avoid failing over to a network access medium that has the same or poorer performance than the current connection. That may occur especially when the cause of a connection failure or degradation not related to the access media. For example, in the case of a general crisis or a large denial of service attack, high network traffic levels may cause service degradation over all network access media, and changing between access media will not yield an improved connection.

In the case where the bandwidth manager has available as a fail-over option a virtual high-speed connection formed by combining a plurality of baseband network access media as a single, multiplexed connection (as described in U.S. Pat. No. 6,373,852 discussed above), QoS data must be gathered for the combined connection. A combined QoS metric could be measured by actually establishing the connection in advance, or the metric could be estimated, taking into consideration bandwidth losses to channel coordination functions, etc.

The method and system of the invention use the vantage point of the bandwidth manager in the network for determining whether a network access medium is degrading, whether it would be advantageous to change to another access medium, and, if so, which of the alternative access media would yield the best performance. Because QoS data is gathered on the network side of the access media, more information is available for accurately measuring and comparing performance.

The bandwidth manager 110 may be configured to retain in a report database records of fail-over commands sent to the premises equipment, and to generate and deliver reports from time to time. The reports may tabulate or summarize how often a network access medium was switched, a frequency of use of the network access media, and performance/QoS measurements of each of the network access media. Those records and reports may alternatively be stored and/or generated at the premises equipment.

Returning to FIG. 3, once it is determined that a fail-over will likely improve the network connection to the CPE box, and, if so, which of the available alternative access media is likely to yield the best QoS, a message is transmitted (step 330) to the premises equipment to change from the current network access medium to a specified fail-over medium. Upon receiving the command, the CPE box begins using the specified alternate access medium for establishing network connections.

In certain cases, the bandwidth manager may determine that a fail-over to a dial-up network access medium will yield the best QoS metrics. As noted above, the CPE box may maintain an active dial-up connection for use as a fail-over network access medium. In another embodiment of the invention, the dial-up connection is not established until that determination is made; i.e., when the command from the bandwidth manager is received at the CPE box, the modem in the CPE box dials a telephone number of a network service provider and establishes a connection. If the performance of an as-yet unestablished dial-up connection is considered in determining whether to fail-over, that performance must be based on predicted or historic QoS metrics because, without a currently-established dial up connection to measure, no real-time data is available.

Figure 5:
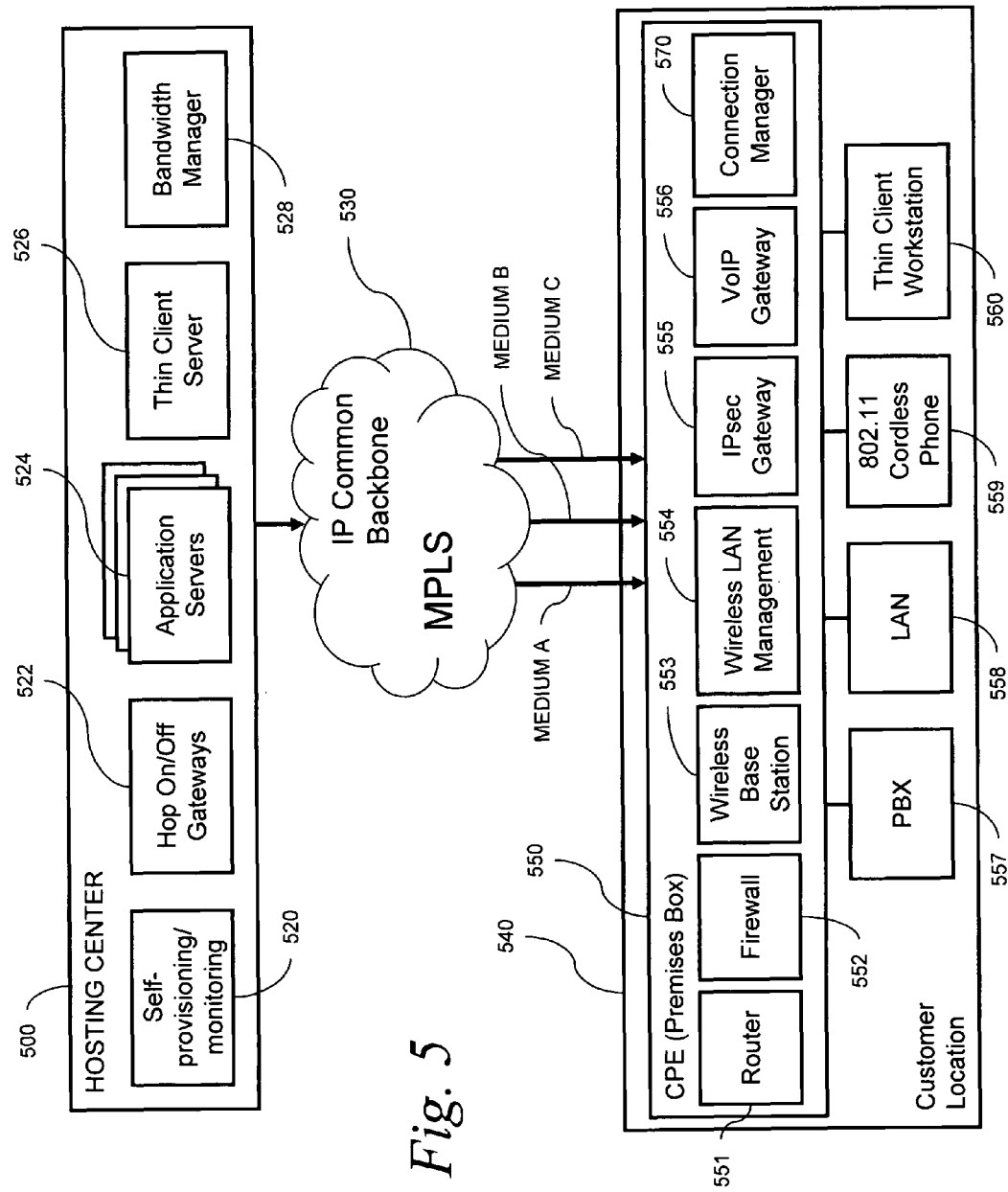
FIG. 5 is a flow chart depicting a method utilized in one embodiment of the invention.

FIG. 5 is a schematic diagram showing a full-featured network access system according to the invention. A network hosting center 500 serves a customer premises location 540 through an IP common backbone 530. Where an ATM network is used, the IP common backbone preferably utilizes multi-protocol label switching (MPLS) to speed the ATM network in routing IP packets. Network access of the CPE box 550 is provided via alternative media; i.e., medium A, medium B and medium C.

The customer location 530 includes a CPE box 550 which contains a connection manager 570, as described above. In addition, the CPE box may contain one or more of a router 551, firewall 552, wireless base station 553, wireless LAN management module 554, IPsec gateway 555 and VoIP gateway 556. Those components may work integrally with the connection manager 570 to optimize the fail-over technique of the invention.

For example, in maintaining connections over alternate media, the connection manager 570 may maintain a secure connection over an alternate network access medium via the IPsec gateway 555. In that way, measurements of QoS parameters across that medium will reflect the additional burden of the IPsec protocol, and yield a more accurate indication of the real-world performance of that medium.

Similarly, if the network connection is being used for VoIP, the VoIP gateway 556 may be used to receive and reply to test messages to more accurately reflect QoS in a VoIP environment.

At the customer location 540, the CPE box 550 may provide a network connection for various local networks, such as a PBX 557 and LAN 558. Preferably, the CPE box provides full networking and security capability, permitting the customer to utilize a thin client workstation 560 to communicate with a thin client server 526 of the hosting center. Wireless networking capability of the CPE box further enables the direct use of an 802.11 cordless phone.

The hosting center 500 may be provided by a network access provider or by a separate entity. The hosting center includes a bandwidth manager 528 as described above. Additionally, the hosting center may include one or more application servers 524. Gateways 522 provide hop-on/hop-off functionality. The hosting center may further enable self-provisioning and monitoring 520.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein as being used primarily in connection with the use of multiple network access media connecting a residential LAN to the Internet, other applications are also contemplated. For example, the invention may be used in connection with an office LAN connected to a wide-area enterprise network through a plurality of T1 or T3 trunks, for example. In that case, the QoS parameters of those trunks are remotely monitored from a bandwidth manager in the enterprise network according to the technique of the invention, and a fail-over is performed when performance would be improved. It is to be understood that the embodiments shown and described herein are only illustrative of the principles of the present invention and that various modifications may be implemented by those skilled in the art without departing from the scope and spirit of the invention.

What is claimed is:

1. A method for providing automatic fail-over service for premises equipment that is accessing a network via a first network access medium, the fail-over service providing fail-over from the first network access medium to a second network access medium, the method comprising:
- at the premises equipment, responding to a first network ping received from a location remote from the premises equipment through the network and through the first network access medium;
- at the premises equipment, responding to a second network ping received from the location remote from the premises equipment through the network and through the second network access medium;
- at the premises equipment, receiving a message from the location remote from the premises equipment to change from accessing the network via the first network access medium to accessing the network via the second network access medium; and
- at the premises equipment, in response to the message, changing from accessing the network via the first network access medium to accessing the network via the second network access medium.

2. The method of claim 1, wherein the location remote from the premises equipment is an application server connected through the network to the premises equipment.

3. The method of claim 1, further comprising:
- at the location remote from the premises equipment, measuring current quality of service metrics of the first network access medium and the second network access medium.

4. The method of claim 3, wherein the message is received from the remote location only if the quality of service metric of the second network access medium indicates a superior quality of service than the corresponding quality of service metric of the first network access medium.

5. The method of claim 4, wherein the receiving is further contingent on obtaining historical quality of service metrics and comparing the current quality of service metrics to the historical quality of service metrics.

6. The method of claim 1, wherein the first and second network access media are selected from a group consisting of a T1 service, a T3 service, a digital subscriber line, a hybrid fiber coaxial cable network and a standard telephone access line.

7. The method of claim 1, wherein at least one of the first and second network access media is a plurality of baseband access media carrying a signal multiplexed among them.

8. The method of claim 1, further comprising:
- creating for use in a report a record of the message transmitted to the premises equipment.

9. A customer premises equipment box with automatic fail-over service between first and second network access media connections to a wide area network, comprising:
- a first connection port connecting to the network via a first network access medium;
- a second connection port connecting to the network via a second network access medium;
- a processor and a tangible computer readable memory containing computer-executable instructions that, when executed by the processor, perform the operations of:
- transmitting a first ping response through the network and through the first network access medium, to a location remote from the customer premises equipment box;
- transmitting a second ping response through the network and through the second network access medium, to the remote location;
- receiving a command from the remote location to fail-over from the first network access medium to the second network access medium; and
- in response to the command, failing over from the first network access medium to the second network access medium.

10. The customer premises equipment box of claim 9, wherein the location remote from the premises equipment is an application server connected through the network to the customer premises equipment box.

11. The customer premises equipment box of claim 9, wherein the first and second network access media are selected from a group consisting of a T1 service, a T3 service, a digital subscriber line, a hybrid fiber coaxial cable network and a standard telephone access line.

12. The customer premises equipment box of claim 9, wherein at least one of the first and second network access media is a plurality of baseband access media carrying a signal multiplexed among them.

13. The customer premises equipment box of claim 9, wherein the non-transitory computer-executable instructions are further for:
- creating a record of the command received by the customer premises equipment box for use in a report database.

14. The customer premises equipment box of claim 9, wherein the non-transitory computer-executable instructions are further for:
- maintaining the second network access medium in an active state.

15. The customer premises equipment box of claim 14, wherein the second connection is via dial-up modem and the instructions to maintain the second connection in an active state include instructions to redial the modem as necessary.

16. The customer premises equipment box of claim 9, further comprising a local area network connection for client computers.

* * * * *